UNITED STATES PATENT OFFICE.

BENJAMIN T. BROOKS AND DILLON F. SMITH, OF PITTSBURGH, PENNSYLVANIA, ASSIGNORS TO GULF REFINING COMPANY, OF PITTSBURGH, PENNSYLVANIA, A CORPORATION OF TEXAS.

CHLORINATION OF OIL-GAS.

1,235,283.     Specification of Letters Patent.     Patented July 31, 1917.

No Drawing.     Application filed March 16, 1916. Serial No. 84,697.

*To all whom it may concern:*

Be it known that we, BENJAMIN T. BROOKS and DILLON F. SMITH, both citizens of the United States, residing at Pittsburgh, Allegheny county, State of Pennsylvania, have invented certain new and useful Improvements in Chlorination of Oil-Gas; and we do hereby declare the following to be a full, clear, and exact description of the invention, such as will enable others skilled in the art to which it appertains to make and use the same.

This invention relates to the chlorination of oil gas, and particularly to the chlorination under conditions which result in the production of dichlorinated derivatives of the unsaturated hydrocarbons contained therein.

Oil gas, when suitably produced, is rich in olefins, particularly in the olefins of the ethylene series. The composition of the oil gas will vary with the conditions under which it is produced, and the gas may, accordingly, contain increased or decreased amounts of olefins and saturated hydrocarbons. Typical specimens of the oil gas may have a composition of about 43% olefins, about 16% hydrogen and about 30 to 33% saturated hydrocarbons, particularly methane, or a composition of about 33% unsaturated hydrocarbons, about 20% hydrogen and about 45% saturated hydrocarbons.

The olefins or unsaturated hydrocarbons of oil gas consist principally of ethylene and propylene, together with relatively small amounts of other hydrocarbons such as butylene, amylene, benzol, etc. The relative proportions of ethylene and propylene, which are the principal unsaturated constituents, will also vary with different oil gases, depending upon the method of production, the material from which produced, etc. The relative proportions of these hydrocarbons can be to a certain extent varied and regulated by regulation of the production.

The present invention relates to the production of chlorinated derivatives from such unsaturated hydrocarbons, and particularly to the production of mixtures of dichlorinated derivatives thereof.

According to the present invention, the oil gas is passed directly into and through a body or bodies of sulfuryl chlorid ($SO_2Cl_2$), and the temperature is preferably maintained within the range of 10° to 40° C. to prevent the formation of chlorids higher than the dichlorids. Thus, it is desired to convert ethylene into its dichlorid, rather than the trichlorid or higher chlorids. The reaction with the sulfuryl chlorid is accordingly modified and regulated so that the dichlorinated derivatives are produced, sulfur dioxid being at the same time set free.

We are aware that it has been proposed heretofore to subject higher unsaturated hydrocarbons, such as amylenes and hexylenes to the action of sulfuryl chlorid by mixing the liquid hydrocarbons with the sulfuryl chlorid and by finally heating the mixture to complete the reaction. Such higher hydrocarbons are of a liquid rather than a gaseous nature, and are otherwise distinguished in their properties from the gaseous constituents of oil gas. So also, the chlorids produced from such higher liquid hydrocarbons partake of a different nature and possess different characteristics than the chlorids produced from the constituents of oil gas.

The chlorination of the constituents of oil gas by passing the gas through the body or bodies of sulfuryl chlorid further enables the reaction to proceed smoothly and under regulated conditions in the presence of an excess of the sulfuryl chlorid, while the saturated constituents of the oil gas and the hydrogen which it contains have a beneficial modifying effect upon the progress of the reaction. The saturated hydrocarbons themselves may to some small extent be acted upon, but in general the conditions are not favorable for the chlorination of the saturated hydrocarbons.

Inasmuch as the sulfuryl chlorid is a liquid, and its temperature can be readily regulated, the process can be made a continuous one and the oil gas passed continuously through the body or bodies of the liquid. The operation takes place at ordinary pressures. The reaction can best be carried out in a series of vessels or containers in which the sulfuryl chlorid is placed and through which the oil gas is passed. The chlorinated products tend to be retained in the reaction vessels in which they are formed so that, when a series of vessels are used, the first will be nearly exhausted before the others, and can be disconnected and the second vessel then used as the first and a fresh container added at the end of the series. The fresh oil gas is thus first brought into contact with the sulfuryl chlorid having the highest content of chlorinated hydrocarbons while the oil gas is finally passed through sulfuryl chlorid of a more concentrated nature where the completion of the chlorination is effected, in case unsaturated hydrocarbons have escaped chlorination in the preceding treatment.

Some of the more volatile chlorids may escape with the escaping constituents of the oil gas and it is accordingly of advantage to provide scrubbers at the end of the series of reaction vessels. These scrubbers may contain heavy oil to remove the vapors of ethylene or other chlorids which are contained in the escaping gases.

The contents of the reaction vessels, at the end of the reaction, are washed with water and dilute alkali to remove any unchanged sulfuryl chlorid. The chlorinated hydrocarbons are then distilled and the individual dichlorids, such as ethylene and propylene dichlorids, separately obtained or obtained in admixture with each other, and with other chlorinated hydrocarbons.

The individual dichlorids, or the mixture of dichlorids, are available for use for various purposes. They thus form a Dutch liquid, or a liquid partaking of the nature and properties of Dutch liquid, and can be used for purposes for which Dutch liquid is commonly used. They can be treated by suitable methods and converted into the corresponding glycols, or into other derivatives of the corresponding hydrocarbons.

The sulfur dioxid which escapes during the reaction can be recovered in any suitable manner, when desired, as by cold and compression, and re-chlorinated for use in the further carrying out of the process.

Having thus described our invention, what we claim is:

1. The method of chlorinating oil gas which comprises bringing the gas into reactive relation with liquid sulfuryl chlorid, substantially as described.

2. The method of chlorinating oil gas, which comprises passing the oil gas through one or more bodies of sulfuryl chlorid; substantially as described.

3. The method of chlorinating oil gas, which comprises passing the oil gas through one or more bodies of sulfuryl chlorid at a temperature within the range of 10 to 40° C.; substantially as described.

4. The method of chlorinating oil gas, which comprises passing the oil gas through a series of bodies of sulfuryl chlorid in succession, whereby the chlorination of the unsaturated hydrocarbons of the oil gas is for the most part effected in the first body of the sulfuryl chlorid and whereby the oil gas is supplied to the sulfuryl chlorid containing the largest proportions of chlorinated hydrocarbons; substantially as described.

5. The method of chlorinating oil gas, which comprises passing the gas through one or more bodies of sulfuryl chlorid and recovering any volatile chlorinated hydrocarbons from the escaping gas; substantially as described.

6. The method of chlorinating oil gas, which comprises passing the oil gas through one or more bodies of sulfuryl chlorid and recovering the different dichlorinated hydrocarbons from the product of the chlorination; substantially as described.

In testimony whereof we affix our signatures.

BENJAMIN T. BROOKS.
DILLON F. SMITH.